United States Patent Office 3,073,749

Patented Jan. 15, 1963

3,073,749

PREPARATION OF MICROBIAL INSECTICIDE

John C. Megna, Bakersfield, Calif., assignor to Bioferm Corporation, Wasco, Calif., a corporation of Nevada No Drawing. Filed June 9, 1959, Ser. No. 818,999
22 Claims. (Cl. 195—96)

My invention is directed to a new and useful process for preparing a microbial insecticide and is especially concerned with improvements in the induction of sporulation and crystal formation of the active insecticidal material, all as is hereafter described in detail.

The microbiological control of insects has long ago been suggested and the potential advantages in utilizing such control methods have been well recognized. In brief, they may be summed up as follows:

(1) The harmless and non-toxic nature of insect pathogens for other forms of life and, therefore, the absence of toxic residues.

(2) The unusually high degree of specificity of disease organisms for their insect hosts.

(3) The possible combined application with organic pesticides so as to increase protection in an area.

(4) The ease and inexpensiveness with which insect pathogens can be produced.

(5) The apparent lack of resistance exhibited by insects.

In the practice of my invention, it is particularly advantageous to use the spore-forming bacillus identified as *Bacillus thuringiensis*. This spore-forming bacillus was isolated by E. Berliner from diseased larvae of the Mediterranean flour moth (Ztschr. f. das Gesam. Getreidewezen, 3, 63–70, 1911). Berliner described the organism as a gram positive, peritrichously flagellated spore-forming rod. On sporulation, the cells of the insect pathogen contain at one end a spore and at the other end a diamond-shaped crystal or asporal body. A proteinaceous toxin identical in composition to the crystalline inclusion has been isolated from sporulated cultures of *Bacillus thuringiensis*. (C. L. Hannay and P. Fitz-James, Can. J. Microb., vol. I, pp. 694–710, 1955.) Other spore-forming bacilli which develop an asporal body or a crystalline insect pathogen in the spores can also be utilized, noteworthy among them being *Bacillus sotto*. (Nature, vol. 173, pp. 545, 546, 1954; Can. J. Microb., vol. 2, pp. 111–121, 1956.)

While sporulation and crystal formation occur incident to the growth of *Bacillus thuringiensis* and *Bacillus sotto* and similar insect pathogen producing bacilli under certain conditions in certain fermentation media, there are numbers of difficulties which are encountered in attempting to utilize such known procedures for commercial practice. These involve, among others, unduly long fermentation periods, inadequate or unduly slow sporulation and crystal formation, and related problems in connection with harvesting of the active insect pathogenic material.

I have discovered, among other things, in accordance with my present invention, that, when the fermentation is effected by means of the aforesaid microorganisms in an aqueous liquid nutrient medium under submerged aerated conditions, important improvements result when the said nutrient medium possesses what may be characterized as a certain balance. That balance consists, in the particularly preferred aspects of my invention, in the fermentable carbohydrate and the nitrogen available for growth of the said microorganisms being so related to each other that they are exhausted or depleted at approximately the same time after sporulation has commenced.

If the aforesaid condition is not satisfied, then sporulation begins very slowly and proceeds at a slow rate with the result that, before an appreciable fraction of the cell population has sporulated, those cells which initially sporulated fracture, free spores and crystals are formed, and some spores begin to germinate thereby decreasing the total viable spore count in addition to making the filtration or separation more difficult. For instance, in certain unbalanced conditions of fermentable carbohydrate and nitrogen available for growth in a given nutrient medium, not even 10% sporulation of the culture can be obtained within a practical fermentation cycle. In sharp contrast thereto, when following the teachings of the present invention, percentage population sporulations of 75% to 95% are readily obtained. Moreover, not infrequently, larger crystals are obtained. Still another advantage of the present invention resides in the fact that, because the fermentation period is relatively short, the possibilities of contamination by other microorganisms are appreciably lessened.

With the foregoing guiding principles in view, numerous nutrient media can readily be evolved to meet the aforementioned criteria. It has been found that an unusually satisfactory nutrient medium is a liquid aqueous medium containing 1.86% cane or beet molasses, 1.4% Pharmamedia (oil-free cottonseed endosperm flour), 1.67% corn steep solids, with a buffer to maintain the pH within the preferred ranges as hereafter set forth. Calcium carbonate in an amount of 0.1% of the medium is especially satisfactory as a buffer. Good, but not as satisfactory, results are obtained with (1) an aqueous liquid medium containing 1.4% beet molasses and 1.2% corn steep solids, and (2) an aqueous liquid medium containing 0.6% beet molasses and 0.5% corn steep solids, in each case with 0.1% calcium carbonate as the buffer. The latter two nutrient media give excellent sporulation but cell development is appreciably less than in the case of the aforesaid particularly preferred nutrient medium.

While numbers of assimilable carbohydrates can be used such as various sugars, cane molasses, beet molasses and the like, I have found beet molasses to be particularly satisfactory. Similarly, although corn steep solids are especially desirable, in place thereof other materials can be used such as soy sauce, Sauce Base 2C (A. E. Staley Mfg. Co.) which is a hydrolyzed corn product, and autolyzed yeasts, although with less satisfactory results. Although it has been found that the inclusion in the media of oil free cottonseed endosperm flour, exemplified by the Pharmamedia product, is outstandingly efficacious, in place thereof other oil free cereal flours or meals such as corn oil meal, safflower oil meal, soya bean oil meal and the like can be used. Also, in the broader phases of my invention, such meals or flours can be omitted. However, the utilization of the Pharmamedia or the like results in increases of several fold, for instance, from 2 to 5 times and more, in the cell counts over the employment of media in which said material is not incorporated. My particularly preferred media for the practice of this invention are those aqueous media containing from about 0.6% to about 2% and especially from 1.4% to 1.9% molasses, advantageously beet molasses; up to about 2% and advantageously from 1 to 1.5% Pharmamedia or similar oil free cereal meal or flour; from about 0.5% to about 1.9% and especially 0.8 to 1.7% corn steep solids; and a small amount of a buffer, most desirably calcium carbonate, a suitable amount being about 0.1%.

In carrying out the fermentation procedure, the pH of the nutrient medium is adjusted with sodium hydroxide, potassium hydroxide or other suitable base to a pH in the range of 7.2–7.6. The nutrient medium is then batch sterilized for 20–30 minutes at 121 degrees C. The fermenter containing the thus prepared nutrient medium is inoculated with about 5% of its volume of vegetative inoculum which is preferably in the log phase of growth, although it may be observed that the time of transfer of the inoculum is not critical.

The vegetative inoculum for seed tanks and fermenters may be produced by standard submerged fermentation techniques and usually consists of two or more transfer stages of liquid broth in shaken flasks. One suitable method for preparing the inoculum is as follows:

From a 24–48 hour old culture of *Bacillus thuringiensis* grown on the surface of an agar slant, a loopful of organismss is inoculated into 75 milliliters of nutrient broth contained in a 500 milliliter Erlenmeyer flask. Incubation is conveniently carried out at 30 degrees C. under highly aerobic conditions. Aeration is advantageously achieved by placing the inoculated flasks on a rotary shaker making 220 one-inch motions per minute. Twenty-four hours after the above primary incubation, a one-liter flask containing 125 mls. of an aqueous medium comprising beet molasses (1.02%), corn steep solids (0.85%) and calcium carbonate (0.1%) is inoculated with 5%–10% of the nutrient broth culture and incubated as described. This latter flask, after 24 hours incubation, is the seed culture for further work.

The fermentation proper, after inoculation as described above, is preferably run with about 5 p.s.i.g. back pressure with a superficial velocity of about 5.3 ft./min. at the sparger with or without agitation and at an incubation temperature of about 30 degrees C. The pH of the fermentation drops from an initial value of about 7.2–7.6 to about 6.4–6.6 and then rapidly rises to about 7.5–8.5. Bacterial cell counts per cm.$^3$, particularly where fermentation media are employed such as those containing about 1.86% beet or cane molasses, 1.4% Pharmamedia, 1.7% corn steep liquor solids, and 0.1% calcium carbonate, reach about 2 to $5\times10^9$ and ordinarily approximately 3 to 7 hours after maximum growth has been reached sporulation commences. Such sporulation then proceeds at a relatively constant rate for about 5 to 10 hours after peak growth and relatively little cell lysis occurs before this time. The fermentation period will ordinarily range from about 14 to about 32 hours with about 16 to 20 hours being generally the optimum.

Recovery of the spores and crystals is particularly advantageously carried out by adding a filter aid, such as Celite 512, in appropriate amount, for instance 2%, filtering through a pressure filter, and drying the filter cake in a forced circulation or vacuum drier at 40–50 degrees C. The separation of the cells and crystals from the spent fermentation broth can, however, be accomplished by other procedures, for instance, by centrifugal means such as solid basket centrifuges, perforated basket centrifuges, or continuous centrifugal separators and without the use of filter aids. The recovery steps should proceed as rapidly as is reasonably possible, particularly through the filtration step, to prevent or reduce the fracturing of intact cells, germination of spores, and/or autolysis.

It is to be understood that, when reference is made to the time of exhaustion or depletion of the fermentable carbohydrate, it is the carbohydrate available for growth of the microorganism which is intended. This can readily be measured by conventional techniques in the art. Similarly, the exhaustion or depletion of the nitrogen, as here encompassed, is, as stated, that nitrogen which is available for growth of the microorganism. This, too, is readily measurable by analytical techniques well known in the fermentation art.

As indicated above, in the particularly preferred aspects of my invention, the medium balance should be such that the fermentable carbohydrate and the nitrogen available for growth of the *Bacillus thuringiensis*, or *Bacillus sotto* or analogous insect pathogen producing bacilli, for instance, *Bacillus entomocidus* var. *entomocides*, are exhausted or depleted at approximately the same time after sporulation has commenced. In the manner in which the method of my invention is carried out, the fermentation period is usually in the range of about 28 to 32 hours although this time can, of course, be varied. Several hours after maximum growth has been reached, sporulation commences, such sporulation commonly beginning in from about 10 to about 18 hours after commencement of the fermentation. I have found that good results can also be obtained where, after sporulation has begun, the exhaustion or depletion of the available fermentable carbohydrate and the exhaustion or depletion of the nitrogen available for growth occur within a time period, in relation to each other, of 2 hours or 4 hours and even as much as 6 hours.

The following table shows the results of several fermentations carried out under the fermentation conditions described above, the first seven runs using an aqueous fermentation medium containing about 1.4% beet molasses, about 1.2% corn steep solids and 0.1% calcium carbonate, and runs 8 and 9 using an aqueous fermentation medium containing about 1.86% beet molasses, about 1.4% Pharmamedia, about 1.7% corn steep liquor solids and 0.1% calcium carbonate, and effecting the fermentation with *Bacillus thuringiensis.*

*Table*

| Run No. | Fermentation Age at Depletion of Carbohydrate, hrs. | Fermentation Age at which Growth Ceased (Available Nitrogen Depleted), hrs. | Percent Sporulation at Harvest |
|---|---|---|---|
| 1 | 10 | 15 | 90 |
| 2 | 16 | 10 | [1] 100 |
| 3 | 16 | 20 | 87 |
| 4 | 12 | 18 | [1] 100 |
| 5 | 12 | 16 | [1] 100 |
| 6 | 16 | 14 | [1] 100 |
| 7 | 16 | 16 | [1] 100 |
| 8 | 10 | 12 | [1] 100 |
| 9 | 10 | 14 | [1] 100 |

[1] Approx.

In typical runs, utilizing the teachings of my foregoing disclosures, whole cultures weighing of the order of 330 pounds and containing a total count of from 1 to $5\times10^9$ bacterial cells and a like spore count, after treatment with 2% Celite 512, drying and grinding, produced about 7.5 to 9 pounds of final powder containing 96.7% solids and a spore count of 15 to $35\times10^9$. Where Celite or other filter aid is not used, final products can be obtained which are several times, for instance, 5 to 10 times, more potent.

In the practice of the method of my invention, I find it especially advantageous to utilize the microorganism *Bacillus thuringiensis* of which variant forms or mutants can, of course, be utilized.

As pointed out above, it has been found particularly advantageous to effect recovery of the spores and crystals by adding a filter aid, such as Celite 512, filtering through a pressure filter and drying, and emphasis was placed upon the matter of effecting such steps, particularly through the filtration step, as rapidly as is reasonably possible in order to prevent or reduce the fracturing of intact cells, germination of spores, and/or autolysis. This technique represents a facet of my invention entirely independently of whether the novel procedure, in the fermentation process of adjusting the medium so that the fermentable carbohydrate and the nitrogen available for growth are exhausted at approximately the same time or within not more than 6 hours of each other after the commencement of sporulation, is utilized. In place of Celite 512, other filter aids such as diatomaceous earths, bentonite, adsorbent silicates such as Methocel, and the like, can be used.

This application is a continuation-in-part of my application Serial No. 748,164, filed July 14, 1958, now abandoned.

What I claim as new and desire to protect by Letters Patent of the United States is:

1. In a fermentation method of preparing microbial insecticides in an aqueous liquid fermentation medium containing fermentable carbohydrate and assimilable nitrogen by means of an insecticidal-producing spore-forming microorganism of the type which both sporulates and also forms crystals, the improvement which consists in carrying out the fermentation under submerged aerated conditions in a medium so adjusted that the fermentable carbohydrate and the nitrogen available for growth are exhausted within not more than 6 hours of each other after the commencement of sporulation.

2. In a fermentation method of preparing microbial insecticides by effecting sporulation and crystal formation in an aqueous liquid fermentation medium containing fermentable carbohydrate and assimilable nitrogen by means of the microorganism *Bacillus thuringiensis,* the improvement which consists in carrying out the fermentation under submerged aerated conditions in a medium so adjusted that the fermentable carbohydrate and the nitrogen available for growth are exhausted within not more than 6 hours of each other after the commencement of sporulation.

3. In a fermentation method of preparing microbial insecticides by effecting sporulation and crystal formation in an aqueous liquid fermentation medium containing fermentable carbohydrate and assimilable nitrogen by means of the microorganism *Bacillus thuringiensis,* the improvement which consists in carrying out the fermentation for a period of about 14 to about 32 hours under submerged aerated conditions in a medium so adjusted that the fermentable carbohydrate and the nitrogen available for growth are exhausted within not more than 6 hours of each other after the commencement of sporulation, and wherein sporulation commences within about 3 to about 7 hours after maximum growth has been reached.

4. In a fermentation method of preparing microbial insecticides by effecting sporulation and crystal formation in an aqueous fermentation medium containing fermentable carbohydrate and assimilable nitrogen by means of the microorganism *Bacillus sotto,* the improvement which consists in carrying out the fermentation for a period of about 14 to about 32 hours under submerged aerated conditions in a medium so adjusted that the fermentable carbohydrate and the nitrogen available for growth are exhausted within not more than 6 hours of each other after the commencement of sporulation, and wherein sporulation commences within about 3 to about 7 hours after maximum growth has been reached.

5. In a fermentation method of preparing microbial insecticides in an aqueous liquid fermentation medium containing fermentable carbohydrate and assimilable nitrogen by means of an insecticidal-producing spore-forming microorganism of the type which both sporulates and also forms crystals, the improvement which consists in carrying out the fermentation under submerged aerated conditions in a medium so adjusted that the fermentable carbohydrate and the nitrogen available for growth are exhausted at approximately the same time after the commencement of sporulation.

6. In a fermentation method of preparing microbial insecticides by effecting sporulation and crystal formation in an aqueous liquid fermentation medium containing fermentable carbohydrate and assimilable nitrogen by means of the microorganism *Bacillus thuringiensis*, the improvement which consists in carrying out the fermentation under submerged aerated conditions in a medium so adjusted that the fermentable carbohydrate and the nitrogen available for growth are exhausted at approximately the same time after the commencement of sporulation.

7. In a fermentation method of preparing microbial insecticides by effecting sporulation and crystal formation in an aqueous liquid fermentation medium containing fermentable carbohydrate and assimilable nitrogen by means of the microorganism *Bacillus thuringiensis,* the improvement which consists in carrying out the fermentation for a period of about 14 to about 32 hours under submerged aerated conditions in a medium so adjusted that the fermentable carbohydrate and the nitrogen available for growth are exhausted at approximately the same time after the commencement of sporulation, and wherein sporulation commences within about 3 to about 7 hours after maximum growth has been reached.

8. In a fermentation method of preparing microbial insecticides by effecting sporulation and crystal formation in an aqueous liquid fermentation medium containing fermentable carbohydrate and assimilable nitrogen by means of the microorganism *Bacillus sotto,* the improvement which consists in carrying out the fermentation for a period of about 14 to about 32 hours under submerged aerated conditions in a medium so adjusted that the fermentable carbohydrate and the nitrogen available for growth are exhausted at approximately the same time after the commencement of sporulation, and wherein sporulation commences within about 3 to about 7 hours after maxiumum growth has been reached.

9. A fermentation method of preparing microbial insecticides which comprises fermenting an aqueous liquid fermentation medium, under submerged aerated conditions, containing from about 0.6 to about 2% beet molasses, from about 0.5 to about 1.7% corn steep solids, and about 0.1% calcium carbonate, by means of an insecticidal-producing spore-forming microorganism of the type which both sporulates and also forms crystals, whereby the fermentable carbohydrate and nitrogen available for growth present in said fermentation medium are exhausted within not more than 6 hours of each other after the commencement of sporulation.

10. A fermentation method of preparing microbial insecticides which comprises effecting sporulation and crystal formation in an aqueous liquid fermentation medium, under submerged aerated conditions, containing from about 1 to about 1.4% fermentable carbohydrate, from about 0.8 to about 1.2% corn steep solids, and a buffer in amount to increase the pH to 7.2–7.6, by means of the microorganism *Bacillus thuringiensis,* whereby the fermentable carbohydrate and nitrogen available for growth present in said fermentation medium are exhausted at approximately the same time after the commencement of sporulation.

11. A fermentation method of preparing microbial insecticides which comprises effecting sporulation and crystal formation in an aqueous liquid fermentation medium, under submerged aerated conditions, containing from about 1 to about 2% fermentable carbohydrate, from about 0.8 to about 1.2% corn steep solids, and a buffer in amount to increase the pH to 7.2–7.6, by means of the microorganism *Bacillus thuringiensis,* whereby the fermentable carbohydrate and nitrogen available for growth present in said fermentation medium are exhausted at approximately the same time after the commencement of sporulation.

12. A fermentation method of preparing microbial insecticides which comprises effecting sporulation and crystal formation in an aqueous liquid fermentation medium, under submerged aerated conditions, containing about 1 to 1.4% beet molasses, about 0.8 to 1.2% corn steep solids, and about 0.1% calcium carbonate, by means of the microorganism *Bacillus thuringiensis,* whereby the fermentable carbohydrate and nitrogen available for growth present in said fermentation medium are exhausted within not more than 6 hours of each other after the commencement of sporulation.

13. A fermentation method of preparing microbial insecticides which comprises effecting sporulation and crystal formation in an aqueous liquid fermentation medium, under submerged aerated conditions, containing about 1 to 1.4% beet molasses, about 0.8 to 1.2% corn steep solids, and about 0.1% calcium carbonate, by means of the microorganism *Bacillus thuringiensis*, whereby the fermentable carbohydrate and nitrogen available for growth present in said fermentation medium are exhausted at approximately the same time after the commencement of sporulation.

14. A fermentation method of preparing microbial insecticides which comprises fermenting an aqueous liquid fermentation medium, under submerged aerated conditions, containing from about 0.6 to about 2% molasses, up to about 2% of an oil free cereal meal or flour, from about 0.5 to about 1.9% corn steep solids, and a buffer, by means of an insecticidal-producing spore-forming microorganism of the type which both sporulates and also forms crystals.

15. A fermentation method of preparing microbial insecticides which comprises fermenting an aqueous liquid fermentation medium, under submerged aerated conditions, containing from about 0.6 to about 2% molasses, from about 1% to about 1.5% of an oil free cotton seed endosperm meal or flour, from about 0.8 to about 1.7% corn steep solids, and a buffer in amount to increase the pH to 7.2–7.6, by means of an insecticidal-producing spore-forming microorganism of the type which both sporulates and also forms crystals.

16. A fermentation method of preparing microbial insecticides which comprises fermenting an aqueous liquid fermentation medium, under submerged aerated conditions, containing from about 1.4 to about 1.9% molasses, from about 1% to about 1.5% of an oil free cottonseed endosperm meal or flour, from about 0.8 to about 1.7% corn steep solids, and about 0.1% calcium carbonate, by means of the microorganism *Bacillus thuringiensis.*

17. The method of claim 1, which includes the steps of adding a filter aid to the fermentation at the end of said fermentation operation, effecting rapid filtration to reduce fracturing of intact cells, and drying the solids.

18. The method of claim 6, which includes the steps of adding a filter aid to the fermentation at the end of said fermentation operation, effecting rapid filtration to reduce fracturing of intact cells, and drying the solids.

19. The method of claim 9, which includes the steps of adding a filter aid to the fermentation at the end of said fermentation operation, effecting rapid filtration to reduce fracturing of intact cells, and drying the solids.

20. The method of claim 12, which includes the steps of adding a filter aid to the fermentation at the end of said fermentation operation, effecting rapid filtration to reduce fracturing of intact cells, and drying the solids.

21. In a fermentation method of preparing microbial insecticides in an aqueous liquid fermentation medium containing fermentable carbohydrate and assimilable nitrogen by means of an insecticidal-producing spore-forming microorganism of the type which both sporulates and also forms crystals, the improvement which consists in carrying out the fermentation under submerged aerated conditions to produce said spores and crystals, adding a filter aid to the fermentation at the end of said fermentation operation, effecting rapid filtration to reduce fracturing of intact cells, germination of spores, and/or autolysis, and then drying said solids.

22. In a fermentation method of preparing microbial insecticides by effecting sporulation and crystal formation in an aqueous liquid fermentation medium containing fermentable carbohydrate and assimilable nitrogen by means of the microorganism *Bacillus thuringiensis*, the improvement which consists in carrying out the fermentation for a period of about 14 to about 32 hours under submerged aerated conditions to produce said spores and crystals, adding a filter aid to the fermentation at the end of said fermentation operation, effecting rapid filtration to reduce fracturing of intact cells, germination of spores, and/or autolysis, and then drying said solids.

References Cited in the file of this patent

Steinhaus: Annual Review of Microbiology, vol. II, 1957, pp. 165–168.

Foster et al.: J. Bact, 1949, pp. 6.39–646.

Kyaysi: Bact. Revs., 1948, pp. 53, 63 and 66.